April 21, 1931.  T. L. BURTON ET AL  1,801,844
ANGLE COCK HOLDER
Filed Nov. 29, 1926
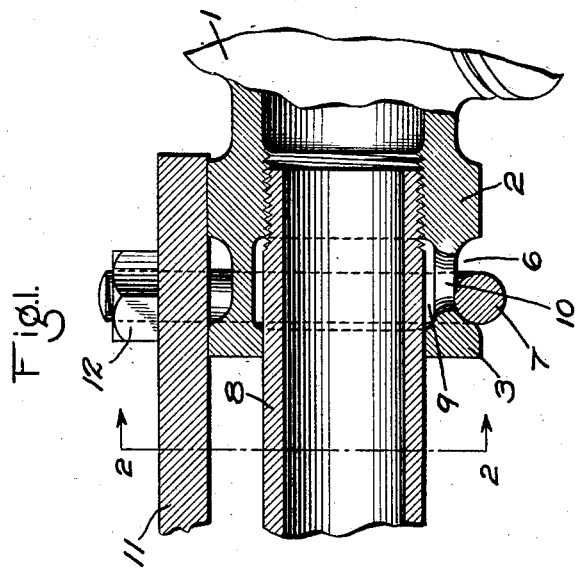
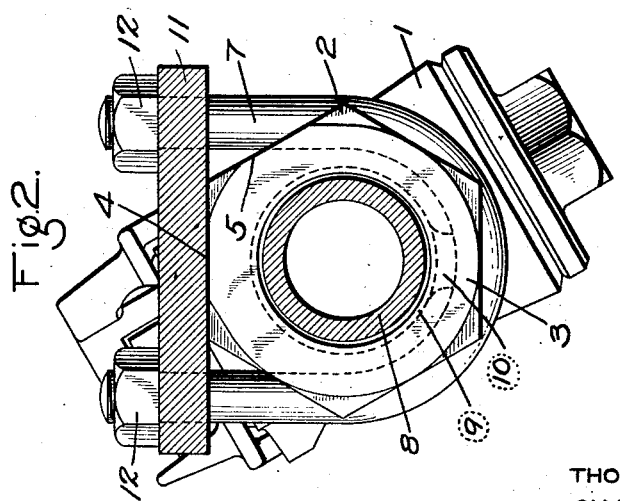
INVENTORS
THOMAS L. BURTON
AND
CLYDE C. FARMER
BY *Wm. M. Cady*
ATTORNEY Patented Apr. 21, 1931

1,801,844

UNITED STATES PATENT OFFICE

THOMAS L. BURTON, OF NEW YORK, N. Y., AND CLYDE C. FARMER, OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA

ANGLE-COCK HOLDER

Application filed November 29, 1926. Serial No. 151,365.

This invention relates to angle cock holders, and the principal object of our invention is to provide an improved angle cock holder of simple construction, which will prevent rotative as well as longitudinal movement of the angle cock, and which will positively maintain the angle cock in the desired inclined position with respect to the car.

In the accompanying drawing; Fig. 1 is a partially sectional view of a portion of an angle cock, showing our improvement as applied thereto; and Fig. 2 a section on the line 2—2 of Fig. 1.

The reference numeral 1 indicates an angle cock of the usual construction as employed on railway cars for controlling communication through the train brake pipe. According to our invention, the pipe portion of the angle cock is extended beyond the usual hexagonal wrench section 2 and at the extreme outer end is provided with a circular section 3 having flat faces 4 and 5 disposed in the plane of a corresponding flat face of the hexagonal section 2.

Intermediate the circular section 3 and the hexagonal section 2 is an annular groove 6 adapted to receive a U bolt 7. The central opening of the pipe portion is interiorly threaded adjacent to the hexagonal section to receive the threaded end of the brake pipe 8 and the extension of the pipe portion beyond the hexagonal section serves as a pipe support, so as to relieve the pipe threads of strain tending to cause leakage.

Between the interior threaded portion and the circular section 3, the pipe portion is provided with an interior annular recess 9 which forms a pocket and an opening 10 extends downwardly from said pocket to the atmosphere.

The usual supporting member 11 is apertured to receive the ends of the U bolt 7 and the angle cock is clamped in position, with one of the faces of the hexagonal section, and either the face 4 or 5 engaging the under side of the supporting member. Nuts 12 are applied to the threaded ends of the U bolt 7 and are screwed down, so as to clamp the angle cock in engagement with the supporting member.

By reason of the above described construction, the full bearing support of a face of the hexagonal section is secured and in addition a support is provided by the flat face of the circular section which is spaced from the hexagonal section by the groove 6.

The construction also provides a support for the pipe, so as to relieve the pipe screw threads of strain.

Another important feature consists in the provision of means for draining the space within the pipe portion surrounding the pipe of moisture.

Moisture tends to collect in this space, but is free to drain out by way of the opening 10.

It will be evident that our invention may be applied to any angle fitting, whether provided with a controlling cock or in which no controlling cock is employed.

Having now described our invention, what we claim as new and desire to secure by Letters Patent, is:—

An angle fitting comprising a body portion and a pipe portion having a hexagonal section and a section extending outwardly from said hexagonal section, said outwardly extending section having an opening to permit drainage of moisture from the interior.

In testimony whereof we have hereunto set our hands.

THOMAS L. BURTON.
CLYDE C. FARMER.